Nov. 17, 1953
D. W. DUDLEY
2,659,635
THRUST BEARING
Filed Nov. 20, 1951
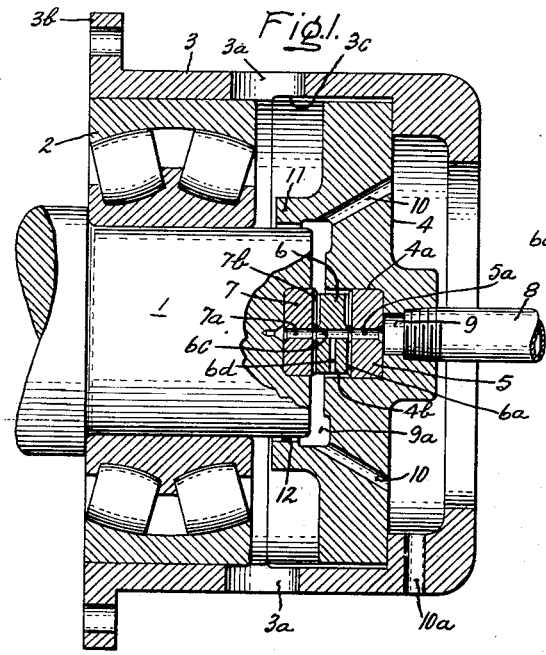
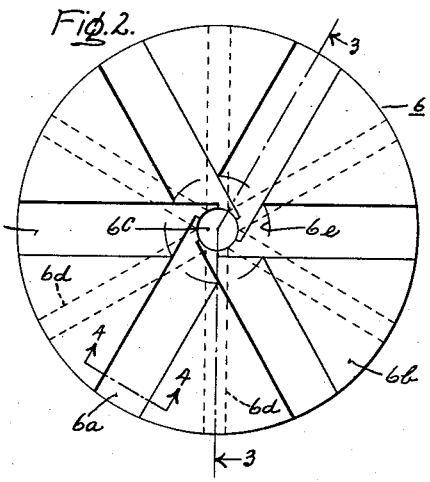
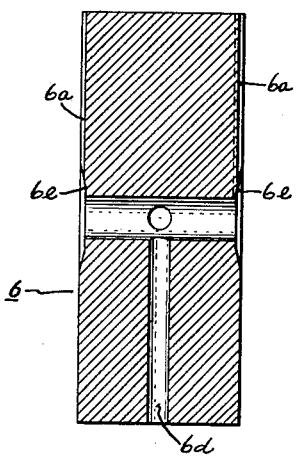
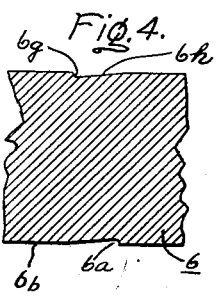
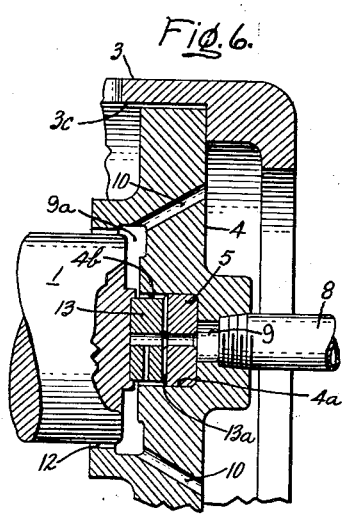
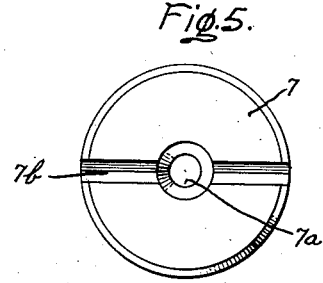
Inventor:
Darle W. Dudley,
by Richard E. Horley
His Attorney.

Patented Nov. 17, 1953

2,659,635

UNITED STATES PATENT OFFICE 2,659,635

THRUST BEARING

Darle W. Dudley, South Peabody, Mass., assignor to General Electric Company, a corporation of New York Application November 20, 1951, Serial No. 257,349

10 Claims. (Cl. 308—172)

This invention relates to thrust bearings for rotating shafts, particularly to a small, high capacity bearing for taking axial thrust loads on the pinion shafts of large reduction gear trains.

Because the thrust capacity of anti-friction type bearings is comparatively low, it has been customary in heavily-loaded gearing to employ thrust bearings of comparatively large size, often of the "tapered land" or "Kingsbury" type. In addition to their size, such bearings have the disadvantage of being quite expensive to build, and have rather substantial power losses because of the large bearing surfaces and high rubbing velocities.

The object of the present invention is to provide an improved thrust bearing of very small size, which is simple, cheap, and easy to manufacture and replace parts in, which has very low power loss, is relatively insensitive to misalignment and errors in machining, and which can be readily incorporated in previously designed gear trains.

Other objects and advantages will become apparent from the following description taken in connection with the accompanying drawings, in which Fig. 1 is a longitudinal section of a thrust bearing incorporating the invention, Fig. 2 is an enlarged view in elevation of one component of the bearing, Fig. 3 is a sectional view taken on the plane 3—3 in Fig. 2, Fig. 4 is a further enlarged detail of the component shown in Figs. 2 and 3, Fig. 5 is a detail view in elevation of another component of the bearing, and Fig. 6 is a longitudinal detail section of a modified form of the bearing.

Generally, the invention is practiced by providing two or more small diameter disks interposed between the end of the shaft and a stationary housing member spaced from the end of the shaft. These small disks are of extremely hard material having very high wear resistance and compressive strength, and are provided with specially shaped grooves defining oil distributing grooves.

Referring now more particularly to Fig. 1, the improved thrust bearing is disclosed as applied to a gear shaft 1 supported in a suitable radial bearing 2, shown here for purposes of illustration as being a two-row roller bearing, although it will be apparent that the type of radial bearing employed is not material to an understanding of the present invention. Bearing 2 is supported in a housing 3 which has oil drain holes 3a and a bolting flange 3b for securing the bearing housing to the main machine frame. The extreme right-hand end portion of housing 3 defines a circular recess 3c in which is disposed a thrust bearing support plate member 4. The central portion of support member 4 has a comparatively deep cylindrical recess 4a adapted to receive the several small disks constituting the thrust bearing members. With the arrangement shown in Fig. 1, there are three of these thrust disk members, identified 5, 6, 7. Generally, it may be stated that one of these disks serves as the thrust bearing member proper, while the adjacent disk functions as an oil distributing member for periodically renewing the oil film on the bearing member.

In Fig. 1, the intermediate disk 6 is the thrust bearing member, and its configuration is shown to an enlarged scale in Figs. 2 and 3. It will be apparent that this disk member has on both surfaces thereof a plurality of equally spaced radially extending grooves 6a, the cross section shape of which is indicated in Fig. 4. It will be seen that one side wall 6g of the groove 6a is substantially perpendicular to the face of the disk. The other wall 6h is inclined at a small angle to the face of the disk and smoothly blends into the sector-shaped lands 6b formed between each adjacent pair of grooves 6a. Oil is supplied to the inner ends of grooves 6a by a central axially extending hole 6c. As will be seen from Figs. 2 and 3, the intermediate disk 6 also has a plurality of radially extending cooling oil passages 6d. These communicate with the central supply passage 6c so that oil pressure and centrifugal force will produce a substantial flow of oil therethrough to remove heat generated in the disk 6 by friction at the thrust surfaces 6b. In this connection, it will be noted that there is a small but significant radial clearance space 4b between the outer circumference of disk 6 and the enclosing circumferential surface of a recess 4a.

It will also be observed in Figs. 2 and 3 that the central portion of the disk defines a shallow recess 6e which serves to distribute oil from the supply passage 6c to the inner ends of the radially extending grooves 6a.

At either side of the thrust bearing disk 6, there is disposed a thrust plate, identified at 5, 7 in Fig. 1. As shown in the enlarged view of Fig. 5, these thrust plate members have an axial oil supply hole 7a which communicates at one face of the disk with at least one diametral oil distributing groove 7b. The function of this groove is to cyclically re-form the lubricating film on the thrust bearing surfaces 6b of thrust bearing disk 6.

As shown in Fig. 1, the thrust plate member 7 is received in a recess in the end of shaft 1, while the other thrust plate 5 is located in the recess 4a in support plate 4. The thrust bearing disk member 6 floats freely between the disks 5 and 7, the pressure of the oil discharged from the radial holes 6d tending to keep this member centered in recess 4a.

Lubricating oil at a suitable pressure, for instance on the order of 30 p. s. i., is admitted through a supply conduit 8 to an inlet port 9 in support disk 4, whence it flows through the axial holes 5a, 6c to the lubricating grooves 6a, 7b and the cooling passages 6d. Spent oil collects in annular chamber 9a formed between the disk 4 and adjacent end of shaft 1, whence it is discharged through a plurality of circumferentially spaced drain ports 10. It will be observed that support disk 4 is provided with a cylindrical extension 11 which defines a small radial clearance space identified 12. The cooling and lubricating oil from the thrust bearing is removed by the passages 10 and a suitable drain port 10a. This arrangement prevents the anti-friction bearing 2 being flooded with oil draining from the thrust bearing.

The operation of the assembly shown in Fig. 1 will be fairly obvious to those skilled in the art from the above description of the structure. Rotation of shaft 1, to which thrust plate member 7 is secured, will induce rotation of the thrust bearing disk 6, at a rotational speed intermediate that of the rotating thrust plate 7 and the stationary thrust plate 5. The resulting relative rotation between thrust bearing disk 6 and thrust plates 5, 7 and the pressure of the lubricating oil will cause oil to flow from the supply grooves 6a up the inclined side wall 6h thereof and be distributed in a very thin film over the thrust bearing surfaces 6b. The friction between disk 5 and support member 4 serves to prevent relative rotation therebetween. Friction also holds disk 7 stationary relative to shaft 1.

To insure continuous maintenances of a lubricating film on the very highly loaded surfaces 6b, the diametral groove in the thrust plates 5, 7 shown at 7b in Fig. 5 periodically sweeps the bearing surfaces. This feature has been found desirable, since the extremely high unit bearing load on the surfaces 6b seems to prevent the reestablishment of this lubricating film if it once breaks down. With the arrangement shown, the lubricating film is renewed twice in each revolution.

It is of the essence of this invention that the thrust bearing 6 and the thrust plate members 5, 7 are of very small diameter relative to the shafts, and are made of extremely hard material. One material which has been found suitable is that grade of sintered tungsten carbide known to the trade as "Carboloy, Grade 55B." As will be appreciated by those skilled in the art, this material is so hard that the holes therethrough must be molded in when the sintered mass is formed, and the oil distributing grooves must be formed by careful grinding processes. This arrangement, whereby the axial thrust is carried on very small diameter "thrust buttons," results in very low power losses in the bearing because of the comparatively low rubbing velocity at the thrust bearing surfaces and the relatively short moment arm at which the friction force is exerted.

Because of the extreme hardness and high strength in compression of the thrust disk materials, it is possible to design the bearing to take loads unheard of with previously known types of thrust bearing. For instance, the unit loading on the actual bearing surface may be on the order of 10,000 p. s. i. in a bearing designed to run with shaft speeds on the order of 10,000 R. P. M. Yet even in such extreme service, the power losses are extremely small, compared with those occurring in previously known types of thrust bearings of similar capacity.

In less severe service, this bearing may be simplified somewhat as illustrated in Fig. 6. Here, there is only one thrust plate member 5, which may be located in the recess 4a in the support disk 4 as described above in connection with Fig. 1, while a single thrust bearing member 13 is received in a recess defined in the adjacent end of shaft 1. Here it will be seen that thrust member 13 is provided with tapered grooves 13a on only one side. With this arrangement it is intended that all the relative rotation will take place between the thrust plate 5 and the thrust bearing member 13. To this end, friction may be relied upon or suitable key or locking means may be employed to prevent rotation of disk 13 relative to the shaft.

The taper of side wall 6h of groove 6 may be somewhat exaggerated in Fig. 4; and a steeper side-wall may be used. It is, however, important that at least one side wall of the groove have a smoothly contoured shape merging gradually with the thrust bearing surface portion 6b.

It will be apparent that the invention provides an extremely simple thrust bearing arrangement having components which are cheap and comparatively simple to fabricate, yet readily replaced in the event of breakage or excessive wear, being at the same time so small that the arrangement can readily be incorporated in previously constructed machines where the original thrust bearings need to be replaced.

It is contemplated that this very simple and small thrust bearing may make it feasible to use the simpler and cheaper "single helix" gears in reduction gearing instead of the more expensive "double helix" gears presently used in order to reduce or eliminate axial thrust which must be carried by thrust bearings. Because of the simplicity and very high load carrying capacity of bearings incorporating the invention, it is believed that a cheaper reduction gear can be built by using single helix gears with a thrust bearing of the type described herein associated with each shaft, at a considerable saving in size and weight of the gearing.

An unobvious advantage of this bearing is that it is capable of operating for substantial periods after failure of the hardened thrust disks. This apparently is because of the great resistance of the disks to wear and heating.

It will be apparent to those skilled in the art that many alterations and substitution of mechanical equivalents might be made. For instance, while the thrust disk members have been described as being formed of tungsten carbide, other very hard materials such as hardened tool steel might be employed. It will also be apparent that the specific means for supporting the thrust disk members relative to the shaft end surface may take many forms, as may the lubrication supply arrangements. It is, of course, intended to cover by the appended claims all such modifications as fall within the true spirit and scope of the invention.

What I claim as new and desire to secure by Letters Patent of the United States is:

1. A thrust bearing for taking axial loads on a rotating shaft comprising a support member disposed adjacent and spaced axially from an end surface of the shaft and defining a central recess coaxial with the shaft, a thrust plate of hard material having high compressive strength disposed in said recess and having at least one radially extending lubricant supply groove in the face of the plate adjacent the shaft end, a thrust bearing disk of hard material with high compressive strength interposed between the thrust plate and the end of the shaft, said thrust disk having a plurality of circumferentially spaced radially extending grooves in the face thereof abutting the thrust plate, said bearing disk grooves having at least one side wall disposed at an acute angle to the face of the disk and curving smoothly to merge therewith, the disk surface between grooves defining sector-shaped thrust bearing surfaces, and means for supplying lubricating liquid under pressure to said supply groove, whereby relative rotation between the thrust bearing disk and thrust plate causes lubricant from the circumferentially spaced radial grooves to be dragged into the clearance space between the thrust plate and said thrust surfaces, the radial supply groove in the thrust plate serving to replenish the lubricating film on the thrust surfaces at least once during each revolution thereof.

2. A thrust bearing for taking axial loads on a rotating shaft comprising a support member disposed adjacent and spaced axially from an end surface of the shaft and defining a central recess coaxial with the shaft, a thrust plate member disposed in said recess and having at least one axially extending oil supply passage communicating with at least one radially extending oil supply groove in the face of the plate adjacent the shaft end, a thrust bearing disk member interposed between the thrust plate and the end of the shaft, said thrust bearing disk having a plurality of circumferentially spaced radially extending grooves in the face thereof abutting the thrust plate, said bearing disk grooves having at least one side wall disposed at an acute angle to the face of the disk and merging smoothly therewith, the disk surface between the circumferentially spaced radial grooves defining sector-shaped thrust bearing surfaces, and means for supplying lubricating liquid to said axial passage in the thrust plate member, whereby relative rotation between the thrust bearing disk and thrust plate causes lubricant from the grooves to be dragged into the clearance space between the thrust plate and said thrust bearing surfaces, the radial groove in the thrust plate serving to replenish the lubricating film on the bearing surfaces at least once during each revolution.

3. A thrust bearing in accordance with claim 2 in which the thrust plate and thrust bearing disk are composed of material having high compressive strength and extreme hardness.

4. A thrust bearing in accordance with claim 2 in which the thrust plate and thrust bearing disk are of sintered tungsten carbide.

5. A thrust bearing in accordance with claim 2 in which the thrust plate and disk are composed of materials of the class including tungsten carbide and hardened tool steel.

6. A thrust bearing for taking axial loads on a rotating shaft comprising a support member disposed adjacent and spaced axially from an end surface of the shaft and having a central recess coaxial with the shaft, a first thrust plate member disposed in said recess and having at least one axially extending oil supply passage communicating with at least one radially extending oil supply groove in the face of the disk adjacent the shaft end, a second thrust plate member disposed in a recess in the adjacent end of the shaft and having at least one radially extending oil supply groove in the surface thereof facing the first disk, a third thrust bearing disk member interposed in abutting relation between said first and second thrust plates, said third disk having a central lubricant supply passage extending axially therethrough and on both faces thereof a plurality of circumferentially spaced radially extending grooves each having at least one side wall disposed at an acute angle to the face of the disk and merging smoothly therewith, the disk portions between the tapered grooves defining sector-shaped thrust bearing surfaces, and means for supplying lubricating liquid to the axial passage in the first thrust plate, whereby relative rotation between the thrust disk and the thrust plates causes lubricant from said tapered grooves to be dragged into the clearance space between the thrust plates and said sector surfaces, the radial grooves in the thrust plates serving to replenish the lubricating film on the thrust bearing sectors at least once each revolution.

7. A thrust bearing in accordance with claim 5 in which the intermediate thrust bearing disk member defines also a plurality of radially extending cooling passages communicating with the central axial passage therein, whereby flow of lubricant through said passages carries away the heat generated by friction at the thrust bearing surfaces.

8. A thrust bearing in accordance with claim 6 in which the thrust plate support member has an axially extending annular portion surrounding the shaft end portion and defining a small radial clearance therewith, said support member also defining at least one lubricant drain passage communicating with the annular chamber defined between the support member and the end of the shaft.

9. A disc member for a thrust bearing comprising a right cylindrical member of short axial length formed of sintered tungsten carbide and having a central axial passage communicating with a plurality of radially extending circumferentially spaced cooling passages discharging through the periphery of the disc, at least one flat side face of the disc defining a plurality of circumferentially spaced radially extending grooves communicating with said central axial passage and each having at least one side wall disposed at an acute angle to the face of the disc and merging smoothly therewith, the disc portions between the grooves defining sector-shaped thrust bearing surfaces.

10. A tungsten carbide bearing disc member in accordance with claim 9 having circumferentially spaced radially extending grooves on both side surfaces thereof whereby both sides define sector-shaped thrust bearing surfaces.

DARLE W. DUDLEY.

References Cited in the file of this patent

UNITED STATES PATENTS

| Number | Name | Date |
|---|---|---|
| 322,400 | Straub | July 14, 1885 |
| 441,455 | Walker | Nov. 25, 1890 |
| 514,684 | Pessano | Feb. 13, 1894 |
| 847,203 | Reist | Mar. 12, 1907 |
| 1,786,565 | Freeman | Dec. 30, 1930 |
| 2,362,667 | Schmidt | Nov. 14, 1944 |
| 2,590,761 | Edgar | Mar. 25, 1952 |

FOREIGN PATENTS

| Number | Country | Date |
|---|---|---|
| 279,847 | Great Britain | Jan. 26, 1928 |